UNITED STATES PATENT OFFICE 2,411,646

DISAZO DYESTUFFS AND PROCESS OF MAKING SAME

Walter Anderau, Basel, Switzerland, assignor to Society of Chemical Industry in Basle, Basel, Switzerland, a Swiss company No Drawing. Application August 2, 1943, Serial No. 497,077. In Switzerland August 21, 1942

18 Claims. (Cl. 260—155)

A relatively small number of dyestuffs are already known which contain 8-hydroxyquinoline or its substitution products as a component. However, as far as mono- and disazo-dyestuffs are concerned, these dyestuffs are intended for dyeing wool or other animal fibers or varnishes and plastic masses if devoid of solubilizing groups. Recently it has also become known to make use of 8-hydroxyquinolines for the manufacture of substantive dyes, i. e. dyestuffs possessing affinity for vegetable fibers, such as cotton, linen or rayon from regenerated cellulose. It has been said however that only tris- and polyazo-dyestuffs are sufficiently substantive. Furthermore clear red shades have not been obtained with the known substantive dyestuffs containing 8-hydroxyquinolines as components.

It is an object of the present invention to provide a series of new valuable dyestuffs containing only two azo groups and an 8-hydroxyquinoline as component, which are perfectly substantive. It is a further object of the present invention to provide dyestuffs capable of forming complex metal compounds. More particularly the present invention provides dyestuffs which are perfectly soluble in the form of their normal alkali metal salts, but become substantially insoluble on conversion into complex metal compounds, especially copper compounds, the said conversion being preferably carried out in the dyebath as described below. Still more particularly it is an object of the present invention to provide dyestuffs of the said kind dyeing blue-red to yellow-red shades of good fastness.

It has been found that diazo dyes can be prepared if diazotised amino-azo dyes of the general formula:

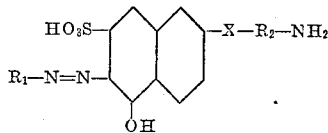

wherein X represents a connecting link containing nitrogen which is different from the azo-group and R₁ and R₂ each represent an aryl radical, are coupled with 8-hydroxyquinolines and the dyestuffs obtained treated, if desired, with agents which yield metals.

The starting products of the above formula are preferably obtained by coupling a diazotised amine of the formula R₁NH₂, where R₁ represents the same radical as above, with products of the general formula

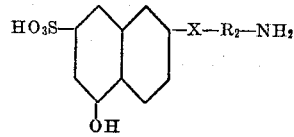

in an alkaline medium. Diazotised amines of the benzene and naphthalene series (whose radical is equivalent to the R₁ of the first formula) are particularly suitable. These amines may contain groups which make the substance water-soluble, such as sulphonic acid or carboxyl groups, and other substituents. In some cases it is advisable to use amines containing a grouping which will form a metallo-complex, in particular a hydroxyl, carboxyl, or alkoxy group, or a grouping —O—alkyl—COOH (particularly —O—CH₂—COOH), for example in the ortho-position to the amino group to be diazotised. Suitable amines are, for example, 2-amino-1-methoxy-benzene-4-sulphonic acid, 2-aminophenol-4-sulphonamide, anthranilic acid, 2-amino-3-naphthoic acid and 1-amino-2-methyl-5-phenoxy acetic acid. Further examples of such amines can be found in the table given later.

The linkage X of the above formula should preferably consist of at least 2 atoms, at least one of which should be nitrogen and the other one, for example, carbon. It may be, in the simplest case, an acid amine group, e. g.

—NH—CO—

This linkage, however, may also be part of a ring which acts, for example, on the ortho-α-position of the naphthalene nucleus, as is the case in the corresponding imidazoles, thiazoles or triazines.

The aryl radical R₂ of the above formulas may belong, for example, to the benzene series and should preferably have the amino-group to be diazotised in the para- or meta-position to the linkage X.

The diazotisation of these amino-azo dyes having the formula given at the beginning is best undertaken in many cases indirectly by adding an acid such as hydrochloric acid at a suitable temperature to a neutral to weakly alkaline solution or suspension of the amino-azo dye containing the necessary amount of sodium nitrite or introducing the latter solution into the acid.

According to the present process this diazotised amino-azo dye, having the formula mentioned at the beginning, is combined with 8-hydroxy-quinolines. Of the latter 8-hydroxy-quinolines itself is primarily suitable, but substituted 8-hydroxy-quinolines such as 5-chlor-8-hydroxy-quinoline, 8-hydroxy-quinoline-5- and -7-sulphonic acid and 8-hydroxy-quinoline-7-carboxylic acid may also be used. The coupling is carried out in an alkaline medium, which may contain, for example, alkali hydroxides such as sodium hydroxide and, if necessary, alkali carbonates.

The compounds should be chosen so that the finished dye does not contain more than 2 sulphonic acid groups.

The dyes obtained by the present process can be used in the usual way for dyeing and printing the most various animal and, in particular, cellulosic fibers such as wool, silk, leather and especially cotton, linen, rayon, and staple fibers from regenerated cellulose. Predominantly bluish red to red to yellowish red shades are obtained.

Particularly valuable products are obtained if these dyes are treated in the substance, in the dye bath or on the fiber with agents which yield metals, principally copper. According to the composition of the dyes, complex metallic compounds, in particular copper compounds, are obtained, which are soluble in water and can be used for dyeing according to methods usual for direct dyeing dyestuffs, or in some cases sparingly soluble to insoluble copper compounds which are best prepared on the fiber itself.

Subsequent treatment of the dyestuffs on the fiber with agents which yield metals (mainly copper) can be carried out by the usual aftertreatment with copper in fresh bath or with advantage in the dye bath itself after dyeing, when copper compounds which are stable to alkalis e. g. complex copper tartrates should be used (cf. U. S. Patent 2,148,659).

Example 1

The amino azo dyestuff (obtainable in the known manner from 20.3 parts of 2-amino-1-methoxy-benzene-4-sulphonic acid by diazotisation and coupling with 35.8 parts of 2-(4'-aminobenzoyl)-a m i n o-5-hydroxynaphthalene-7-sulphonic acid in sodium carbonate alkaline medium), which has been precipitated with sodium chloride, filtered and pressed, is suspended in 400 parts of water. 7 parts of sodium nitrite are added and the whole is cooled to 6° C. by the addition of ice. 30 parts of concentrated hydrochloric acid are added and stirring is carried out for about 2 hours. The diazo compound obtained is now added to a solution of 14.5 parts of 8-hydroxy-quinoline, 15 parts of caustic soda and 20 parts calcined soda in 500 parts of water cooled to 4° C. After a few hours the solution is warmed to 65° C. and 100 to 200 parts of sodium chloride are added in order to obtain an easily filterable form of the diazo dyestuff, and the solution is filtered and the precipitate dried. A dark brown powder is the result having the formula:

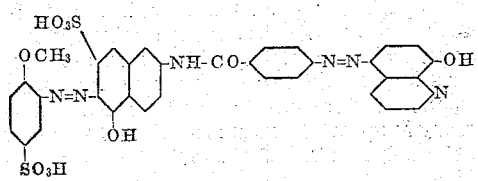

which dissolves in water and dilute alkalies to red solutions and in concentrated sulphuric acid to a violet solution.

Vegetable fibers and regenerated cellulose from neutral or alkaline Glauber salts bath are dyed vivid red shades which when aftertreated with cupric salts, become faster to light and washing.

Example 2

The amino azo dyestuff (obtainable in the known manner from 20.5 parts of 2-amino-1-methyl-4-phenoxy acetic acid by diazotisation and coupling with 35.8 parts of 2-(4'-aminobenzoyl)-amino-5-hydroxynaphthalene-7-sulphonic acid in sodium carbonate alkaline medium), which has been precipitated with sodium chloride, filtered and pressed, is suspended in 400 parts of water. 7 parts of sodium nitrite are added and the whole is cooled to 6° C. by the addition of ice. 30 parts of concentrated hydrochloric acid are then added and stirred for about 2 hours. The diazo compound obtained is now added to a solution of 14.5 parts of 8-hydroxyquinoline, 15 parts of caustic soda and 20 parts of calcined soda in 500 parts of water cooled to 4° C. After a few hours the solution is warmed to 65° C. and 100 to 200 parts of sodium chloride are added in order to obtain an easily filterable form of the diazo dyestuff and then the solution is filtered and the precipitate dried. A dark brown powder of the formula:

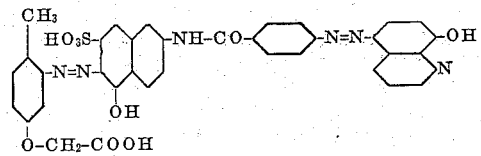

is obtained which dissolves in water and dilute alkalies to red solutions and in concentrated sulphuric acid to a violet solution.

Vegetable fibers and regenerated cellulose are dyed vivid yellowish red shades from neutral or alkaline Glauber's salt bath which when aftertreated with cupric salts become faster to light and washing.

Example 3

The amino azo dyestuff (obtainable in the known manner from 13.7 parts of 2-amino-1-methoxy-4-methylbenzene by diazotisation and coupling with 35.8 parts of 2-(4'-amino-benzoyl)-amino-5-hydroxynaphthalene-7-sulphonic acid in sodium carbonate alkaline medium), which has been precipitated with sodium chloride, filtered and pressed, is dispersed in 400 parts of water. 7 parts of sodium nitrite are added and the whole is cooled to 6° C. with ice. 30 parts of concentrated hydrochloric acid are then added and the whole stirred for about 2 hours. The diazo compound obtained is now added to a solution of 14.5 parts of 8-hydroxyquinoline, 15 parts of caustic soda and 20 parts of calcined soda in 500 parts of water cooled to 4° C. After a few hours the solution is warmed to 65° C. and 100–200 parts of sodium chloride are added in order to obtain an easily filterable form of the disazo dyestuff and then the solution is filtered and the precipitate dried. The result is a dark brown powder which dissolves in water and dilute alkalies to red solutions and in concentrated sulphuric acid to a violet solution.

Vegetable fibers and regenerated cellulose are dyed vivid red shades from neutral or alkaline Glauber's salt bath which when after-treated with cupric salts become faster to light and washing.

Further dystuffs obtained according to the present invention are given in the following table:

| Diazo components, amino-azo dyestuff from— | | Azo component | Shade of the coppered dyeing |
|---|---|---|---|
| 2-aminobenzoic acid | HO₃S—[naphthalene(OH)]—NH—CO—[benzene]—NH₂ | 8-hydroxyquinoline | Brick red. |
| 2-amino-3-naphthoic acid | do | do | Bluish red. |
| 4-aminobenzoic acid | do | do | Dull red. |
| 2 - amino - 1 - hydroxybenzene - 4 - sulfonamide. | do | do | Bordeaux. |
| 2-amino-1-phenoxy-acetic acid-4-sulfonamide. | do | do | Red. |
| 2-amino-4-chlor-1-phenoxy acetic acid. | do | do | Do. |
| 2 - amino - 6 - chlor - 1 - hydroxy - benzene-4-sulfonic acid. | do | do | Bordeaux. |
| 2 - amino - 1 - hydroxybenzene - 4 - sulfonic acid. | do | do | Do. |
| Monosulfonated 2-amino-4-chlor-1-methoxybenzene. | do | do | Red. |
| 2-aminobenzoic acid | do | 5-chlor-8-hydroxyquinoline | Yellowish red. |
| 2-amino-1-methoxy-4-methylbenzene. | do | 8 - hydroxyquinoline - sulphonic acid. | Red. |
| Do | do | 8-hydroxyquinoline-7-carboxylic acid. | Do. |
| 2-amino-4-chlor-1-phenoxy-acetic acid. | do | 8-hydroxyquinoline - 7 - sulfonic acid. | Yellowish red. |
| 2-aminobenzoic acid | HO₃S—[naphthalene(OH)]—NH—CO—[benzene]—NH₂ | 8-hydroxyquinoline | Do. |
| 2-amino-3-naphthoic acid | do | do | Bordeaux. |
| 2-amino-4-chlor-1-phenoxy-acetic acid. | do | do | Yellowish red. |
| 2 - amino - 1 - methoxy - 4 - methylbenzene. | do | do | Do. |
| 2 - amino - 1 - hydroxybenzene - 4 - sulfonamide. | do | do | Bordeaux. |
| 4-aminobenzoic acid | do | do | Reddish orange. |
| 2-aminobenzoic acid | do | 5-chlor-8-hydroxyquinoline | Do. |
| 2 - amino - 1 - hydroxybenzene - 4 - sulfonamide. | do | do | Bluish red. |
| 2-amino-1-methoxy-4-methylbenzene. | do | 8 - hydroxyquinoline - 7 - sulfonic acid. | Bordeaux. |
| 2-amino-1-methoxybenzene-4-sulfonic acid. | HO₃S—[naphthalene(OH)]—[imidazole with N-phenyl, HN, C]—[benzene]—NH₂ | 8-hydroxyquinoline | Do. |
| 2-amino-1-methoxy-4-methylbenzene. | HO₃S—[naphthalene(OH)]—[imidazole with N-(benzene-COOH), HN, C]—[benzene]—NH₂ | do | Do. |
| 2 aminobenzoic acid | HO₃S—[naphthalene(OH)]—NH—[C=N]—[benzene]—NH₂ | do | Yellowish red. |
| 2-amino-1-phenoxy-acetic acid | do | do | Brownish red. |
| 2 - amino - 4 - chlor - 1 - hydroxy-benzene-6-sulfonic acid. | do | do | Bordeaux. |
| 4-aminobenzoic acid | do | do | Red. |
| 4 - amino - 1 - hydroxybenzene - 2 - carboxylic acid. | do | do | Brown. |

| Diazo components, amino-azo dyestuff from— | | Azo-component | Shade of the coppered dyeing |
|---|---|---|---|
| 2-amino-3-naphthoic acid | 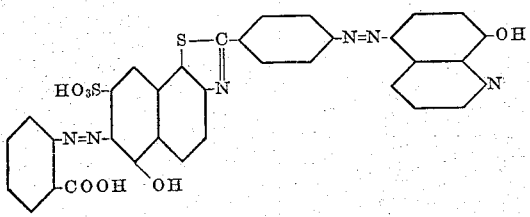 | 8-hydroxyquinoline | Bordeaux. |
| 2-amino-4-chlor-1-phenoxy-acetic acid. | do | do | Bluish red. |
| 2-amino-1-methoxybenzene-4-sulfonic acid. | do | do | Yellowish red. |
| Sulfonated 2-amino-1-methoxy-4-methylbenzene. | do | do | Red. |
| Sulfonated 2-amino-1-methylbenzene. | do | do | Yellowish red. |
| 2-amino-1-benzoic acid | do | 5-chlor-8-hydroxyquinoline | Do. |
| 6-nitro-2-amino-1-hydroxybenzene-4-sulfonic acid. | do | do | Bordeaux. |
| 4-nitro-2-amino-1-hydroxybenzene-6-sulfonic acid. | do | do | Do. |
| 2-amino-1-methoxy-4-methylbenzene. | do | 8-hydroxyquinoline-7-sulfonic acid. | Do. |

*Example 4*

The diazo compound from 13.7 parts of 2-aminobenzoic acid is coupled at room temperature in the presence of an excess of sodium carbonate with 37.2 parts of 4′-aminophenyl-5-hydroxy-7-sulpho-1:2-naphtho-thiazole. After a few hours the coupled mixture is warmed and the monoazo dyestuff is precipitated by the addition of sodium chloride and filtered. This dyestuff is dissolved in 1000 parts of water and diazotised at 4° C. by adding 7 parts of sodium nitrite and 35 parts of concentrated hydrochloric acid. After the diazotisation is complete, the suspension of the diazoazo compound is neutralized with soda and the solution containing 14.5 parts of 8-hydroxyquinoline in 200 parts of 10% caustic soda solution is added. A red disazo dyestuff is formed of the formula:

which is precipitated after a time by warming and addition of sodium chloride. After filtering and drying a dark powder is obtained which dissolves in water and dilute alkalies to red solutions. It dyes vegetable fibers as well as artificial fibers from regenerated cellulose bluish red shades which when after-treated with a cupric salt solution become fast to light and washing.

*Example 5*

100 parts of cotton are entered at 40° C. into a dyebath of 3000 parts of water which contains 1 part of the dyestuff obtained according to Example 1 as well as 2 parts of sodium carbonate, and the temperature is raised to 90 to 95° C. 30 parts of crystallised sodium sulphate are added and dyeing is continued for three quarters of an hour at 90 to 95° C. The dyebath is then cooled to 70° C., the necessary quantity of a solution of a complex copper tartrate rendered weakly alkaline with sodium carbonate is added and coppering carried out during half-an-hour at 70–80° C. The cotton is now thoroughly rinsed and if necessary soaped and finished off as usual. It is dyed red and is fast to light and washing.

What I claim is:

1. A process for the manufacture of a disazo-dyestuff, which comprises coupling, with an 8-hydroxyquinoline capable of coupling, a diazotized aminoazo compound of the formula

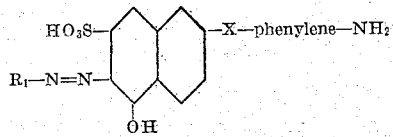

wherein X stands for a link including the arrangement

wherein Y is a member selected from the group consisting of oxygen and a member of a heterocyclic ring leading to the 1-position of the naphthalene nucleus, and wherein $R_1$ stands for an aryl radical.

2. A process for the manufacture of a disazo-dyestuff, which comprises coupling, with an 8-hydroxyquinoline capable of coupling, a diazotized aminoazo compound of the formula

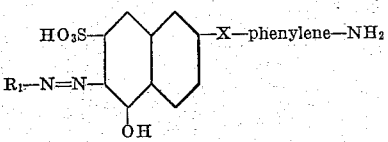

wherein X stands for a link selected from the class consisting of

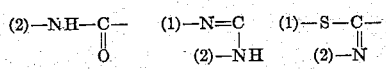

and

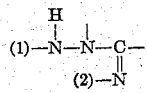

wherein the carbon atom is in each case connected to the phenylene group, the bond designated by (1) is connected to the 1-position of the naphthalene nucleus and the bond designated by (2) being linked to the 2-position of the naphthalene nucleus, and wherein R₁ stands for an aryl radical containing at least one substituent capable of promoting the formation of complex metal compounds.

3. Process for the manufacture of a disazo-dyestuff, which comprises coupling a diazotized aminoazo compound of the formula

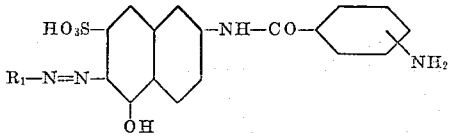

wherein R₁ stands for an aryl radical containing at least one substituent capable of promoting the formation of complex metal compounds, with an 8-hydroxyquinoline capable of coupling.

4. Process for the manufacture of a disazo-dyestuff, which comprises coupling a diazotized aminoazo compound of the formula

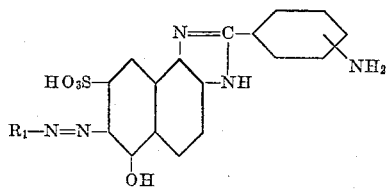

wherein R₁ stands for an aryl radical containing at least one substituent capable of promoting the formation of complex metal compounds, with an 8-hydroxyquinoline capable of coupling.

5. Process for the manufacture of a disazo-dyestuff, which comprises coupling a diazotized aminoazo compound of the formula

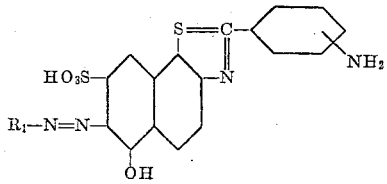

wherein R₁ stands for an aryl radical containing at least one substituent capable of promoting the formation of complex metal compounds, with an 8-hydroxyquinoline capable of coupling.

6. A disazo-dyestuff of the formula

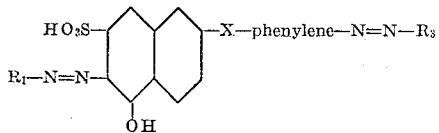

wherein X stands for a link including the ararrangement

wherein Y is a member selected from the group consisting of oxygen and a member of a heterocyclic ring leading to the 1-position of the naphthalene nucleus, R₁ stands for an aryl radical, and R₃ stands for the radical of an 8-hydroxyquinoline coupling component.

7. A disazo-dyestuff of the formula

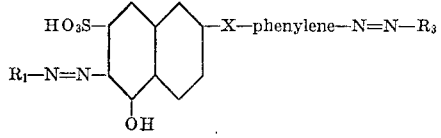

where X stands for a link selected from the class consisting of

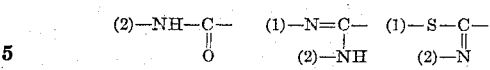

and

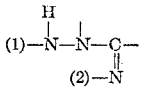

wherein the carbon atom is in each case connected to the phenylene group, the bond designated by (1) is connected to the 1-position of the naphthalene nucleus and the bond designated by (2) being linked to the 2-position of the naphthalene nucleus, R₁ stands for an aryl radical, and R₃ stands for the radical of an 8-hydroxyquinoline coupling component.

8. Process for the manufacture of a disazo-dyestuff comprising coupling the diazotized aminoazo compound of the formula

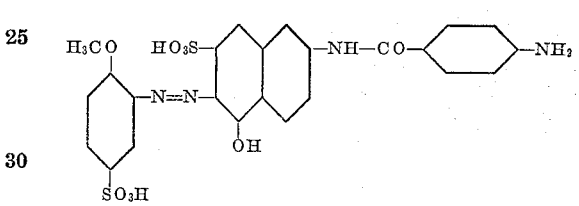

with 8-hydroxy-quinoline.

9. Process for the manufacture of a disazo-dyestuff comprising coupling the diazotized aminoazo compound of the formula

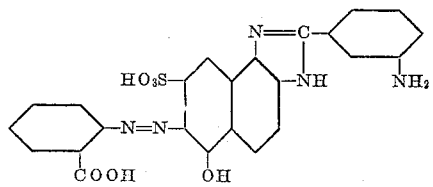

with 8-hydroxy-quinoline.

10. Process for the manufacture of a disazo-dyestuff comprising coupling the diazotized aminoazo compound of the formula

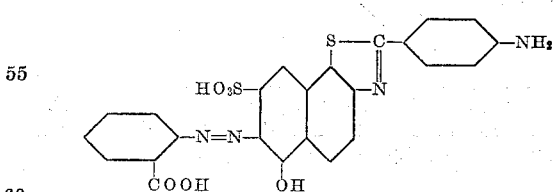

with 8-hydroxy-quinoline.

11. Disazo-dyestuffs of the general formula

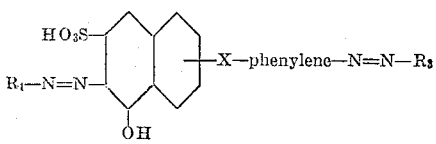

wherein X stands for a link containing at least one nitrogen and at least one carbon atom directly attached to each other, connecting at least one of the positions 1 and 2 of the naphthalene nucleus with the phenylene radical, the nitrogen being connected to the naphthalene nucleus and the carbon atom to the phenylene radical, wherein $R_1$ stands for an aryl radical, and $R_3$ stands for the radical of a 8-hydroxy-quinoline coupling component.

12. Disazo-dyestuffs of the general formula

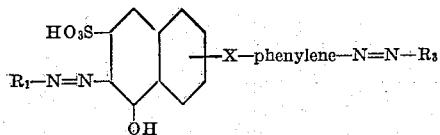

wherein X stands for a link containing at least one nitrogen and carbon atom directly attached to each other, connecting at least one of the positions 1 and 2 of the naphthalene nucleus with the phenylene radical, the nitrogen being connected to the naphthalene nucleus and the carbon atom to the phenylene radical, wherein $R_1$ stands for an aryl radical containing at least one substituent capable of promoting the formation of complex metal compounds, and $R_3$ stands for the radical of a 8-hydroxy-quinoline coupling component.

13. A disazo-dyestuff of the formula

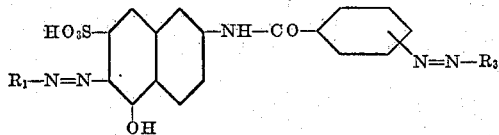

wherein $R_1$ stands for an aryl radical containing at least one substituent capable of promoting the formation of complex metal compounds, and $R_3$ stands for a 8-hydroxy-quinoline radical.

14. A disazo-dyestuff of the formula

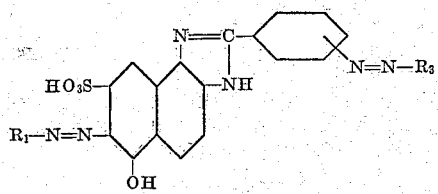

wherein $R_1$ stands for an aryl radical containing at least one substituent capable of promoting the formation of complex metal compounds, and $R_3$ stands for a 8-hydroxy-quinoline radical.

15. A disazo-dyestuff of the formula

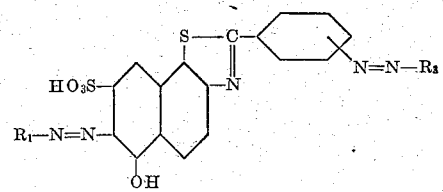

wherein $R_1$ stands for an aryl radical containing at least one substituent capable of promoting the formation of complex metal compounds, and $R_3$ stands for a 8-hydroxy-quinoline radical.

16. The disazo-dyestuff of the formula

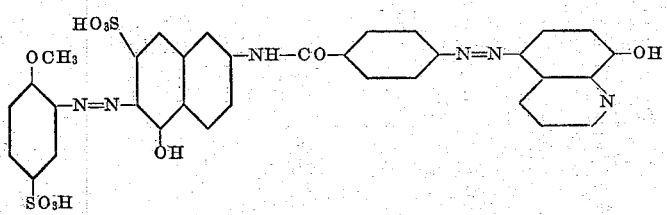

17. The disazo-dyestuff of the formula

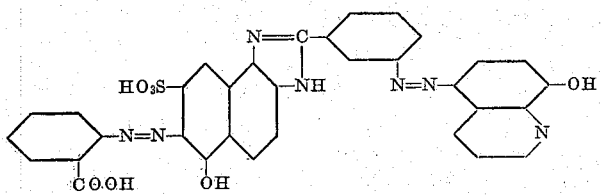

18. The disazo-dyestuff of the formula

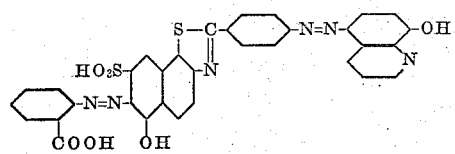

WALTER ANDERAU.

Certificate of Correction

Patent No. 2,411,646. November 26, 1946.

WALTER ANDERAU

It is hereby certified that errors appear in the printed specification of the above numbered patent requiring correction as follows: Column 4, line 29, Example 2, for the word "diazo" read *disazo*; column 9, line 38, claim 5, for that portion of the formula reading "S===C--" read *S----C--*; and that the said Letters Patent should be read with these corrections therein that the same may conform to the record of the case in the Patent Office.

Signed and sealed this 25th day of February, A. D. 1947.

[SEAL]

LESLIE FRAZER,
*First Assistant Commissioner of Patents.*